(No Model.)
J. FITZ.
SLIDE REST.
No. 296,156. Patented Apr. 1, 1884.
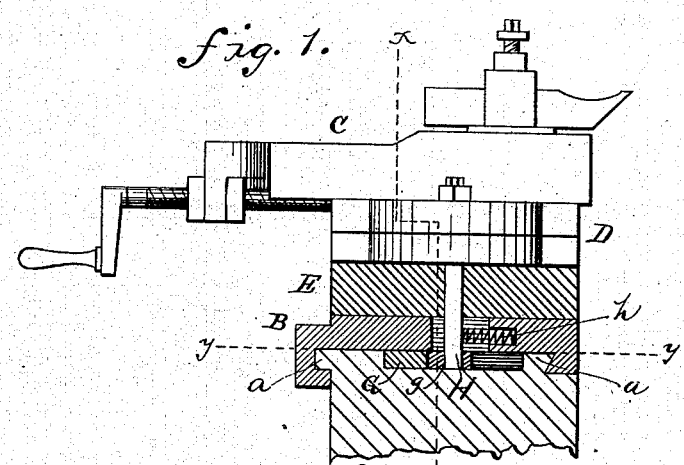
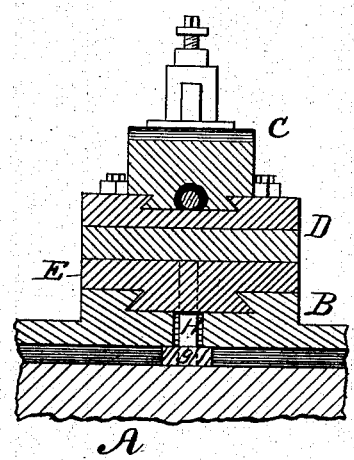
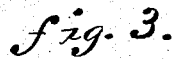
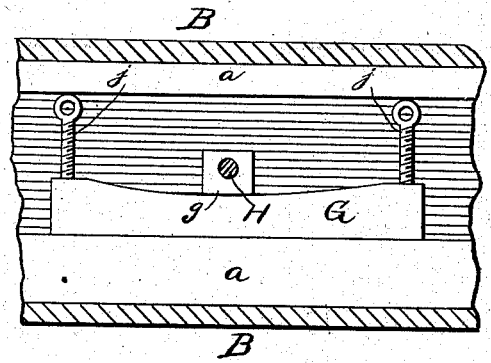
WITNESSES:
H. B. Brown
W. X. Stevens
INVENTOR:
Jacob Fitz
BY Munn & Co.
ATTORNEYS.

UNITED STATES PATENT OFFICE.

JACOB FITZ, OF HANOVER, PENNSYLVANIA.

SLIDE-REST.

SPECIFICATION forming part of Letters Patent No. 296,156, dated April 1, 1884.

Application filed November 2, 1883. (No model.)

*To all whom it may concern:*

Be it known that I, JACOB FITZ, a citizen of the United States, residing at Hanover, in the county of York and State of Pennsylvania, have invented certain new and useful Improvements in Slide-Rests, of which the following is a description.

My invention relates to that class of slide-rests which are used upon turning-lathes to guide the tool in forming the work which is revolved by the lathe; and its object is to provide means whereby work may be turned either cylindrical, conical, or with a longitudinally-curved surface while the lathe-centers remain parallel with the ways.

To this end my invention consists in a sliding block and a guiding form interposed between the usual longitudinally-sliding carriage and the tool-rest carried thereby, constructed as hereinafter described and claimed, reference being had to the accompanying drawings, in which—

Figure 1 is a transverse vertical section of a portion of a lathe, showing my slide-rest in elevation. Fig. 2 is a vertical section longitudinal with the lathe; and Fig. 3 is a horizontal section, part in plan, of the same.

A represents a portion of one of the lathe-bed ways, which in this instance is provided with two parallel guideways, $a$, on which the block B of the carriage is gibbed, as usual, to slide along the lathe parallel with the centers.

C represents the tool-holder, provided with a swiveling base, D, and a feeding-screw, $c$, by which means the tool may be set or fed in any direction, as usual. Between these parts, which are common, I interpose a block, E, gibbed to slide transversely to the lathe in the slide-block B. The way A of the lathe-bed is grooved between its guideways $a$ to receive a pattern or former, G, which is secured to the lathe-bed. The edge of this pattern facing the center of the lathe is formed to the exact shape of the longitudinal outline intended to be given to the work, here shown as the arc of a circle.

H is a pin rigidly fixed in the sliding block E, and having a shoe, $g$, to slide against the edge of the former G, thus causing the slide-block E and all the parts carried thereby, including the cutting-tool, to follow the former in traversing the lathe longitudinally. The resistance of the work to the penetration of the tool forces the tool-carriage back, pressing the shoe $g$ constantly against the former. To assist this action in cases where the work is slim and light, I provide a spring, $h$, acting between the block B and the pin H to force the lathe toward the former G. The former is adapted to be secured to the lathe at any point along the way for the purpose of bringing it in the proper relation to the work. It may be secured to the lathe in any usual manner, such as by the screws $j$, which extend out from the former to bind between the walls of the groove in the way, the former being somewhat longer than the work to be turned.

The operation is as follows: Suppose a pulley is to be turned. Its form should be a spherical zone, and the shape of the former will necessarily be the arc of a circle. Having mounted the pulley on its mandrel on the lathe-centers, bring the tool opposite the center of the pulley. Then move the former G until its center longitudinally coincides with the shoe $g$. Now make the former fast by means of screws $j$, and the work of turning the pulley may be proceeded with as though the former were not in the lathe, except that no setting for taper is required. Of course it is not a necessity to my invention that the former G should rest in a groove in the lathe-way, as any other construction which would bring the former into the relation described with my interposed sliding block, and so hold it when it use, will answer the purpose. The fixed blocks B and F are slotted laterally to permit movement of pin H in following the former.

What I claim as my invention, and wish to secure by Letters Patent, is—

1. The combination, with the block E, the tool-holder carried thereby, and the pin H fixed therein, of the carriage-block B, slotted for pin H, the shoe $g$ on pin H, the former G, fixed behind shoe $g$, and the latheway A, substantially as shown and described.

2. The combination, with the interposed slide-block, the pin fixed therein, and the fixed former described, of a shoe upon said pin to slide upon the former, and a spring acting between a laterally-fixed portion of the longitudinally-sliding carriage and said pin, as shown and described, for the purpose specified.

JACOB FITZ.

Witnesses:
FRANK KAHL,
JOHN B. SNYDER.